June 16, 1942. H. A. LAYSTROM ET AL 2,286,286
MACHINE FOR TESTING METALLIC CARTRIDGE BELT LINKS
Filed April 14, 1941 7 Sheets-Sheet 5

INVENTORS
HILDING A. LAYSTROM
PER O. PERSSON

Patented June 16, 1942

2,286,286

UNITED STATES PATENT OFFICE 2,286,286

MACHINE FOR TESTING METALLIC CARTRIDGE BELT LINKS

Hilding A. Laystrom and Per O. Persson, Chicago, Ill., assignors to Quality Hardware and Machine Corporation, Chicago, Ill., a corporation of Illinois Application April 14, 1941, Serial No. 388,504

10 Claims. (Cl. 209—75)

This invention relates to means for testing the links of metallic cartridge belts for rapid-firing guns.

Metallic cartridge links are usually formed from steel by passage of a steel bank or strip through suitable die mechanism, as for example in the manner disclosed in Laystrom Patent No. 2,232,071, dated February 18, 1941. After forming of the links by the die mechanism, the links are usually subjected to a heating and tempering treatment so that they will have the required strength and elasticity. When the links and cartridges are assembled to form a belt, the spacing between cartridges should be within certain tolerances, so that the cartridges will properly align with the gun barrel when the belt is fed through the gun. Sometimes links may have soft spots in the metal or may not have been properly tempered, or they may have become slightly distorted from handling or shipping. If such faulty links are assembled in a belt, and the belt is subjected to any strain, the faulty links may become distorted or stretched beyond their elastic limit so that they may interfere with proper cartridge alignment and gun firing. It therefore becomes desirable to subject the links to accurate testing before assembly thereof into belts.

The important object of our invention is to produce a simple testing structure or machine to which the links are fed and subjected to proper tests for determining their fitness, with provision for ejecting from the feed line any links which fail to pass the test.

More in detail, the object of our invention is to produce a simple, efficient testing machine into which links of the proper dimension and shape are fed to travel through a test passageway, to be first subjected to a stretch resisting test by application of a predetermined force, and to be ejected from the test line if such test results in overstretching of the link, the link being then subjected to an elastic recovery test and being ejected from the test line if, after passing the stretching test, the link has failed to return to proper shape within permitted tolerances.

The machine of our invention is disclosed on the accompanying drawings, in which drawings:

Figure 16 is an enlarged section on plane XVI—XVI of Figure 15; and,
Figure 17 is a section on plane XVII—XVII of Figure 16.

Figures 1, 7, 8:
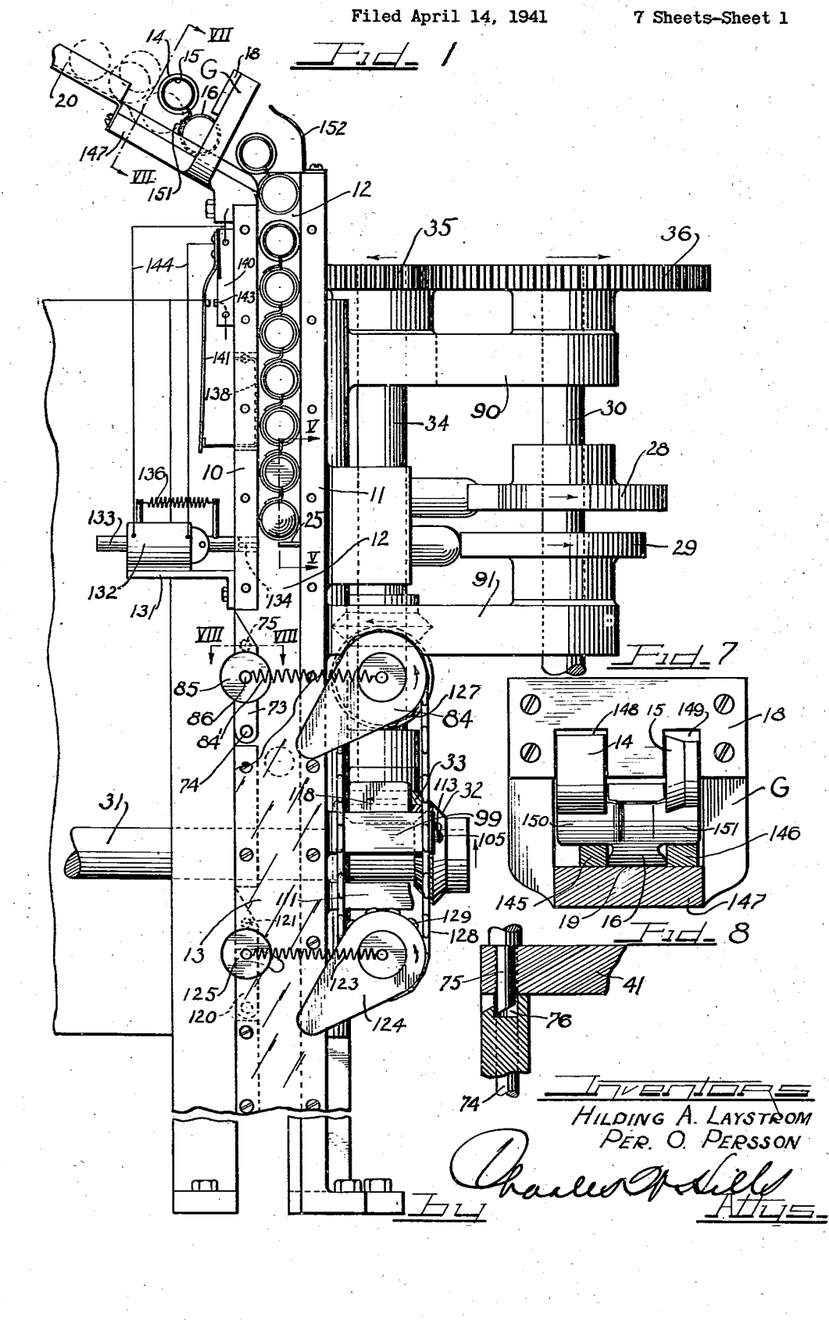
Figure 1 is a front elevation of the machine.
Figure 7 is an enlarged section on plane VII—VII of Figure 1.
Figure 8 is an enlarged section on plane VIII—VIII of Figure 1.

The machine shown comprises suitable supporting framework F having at one side the vertically extending parallel walls 10 and 11 forming the sides of a vertical test passageway 12, normally closed by a removable cover 13. The particular links for which the machine has been designed are best shown on Figures 4 and 5. Each link comprises axially aligned spaced apart circular loops 14 and 15 for receiving, respectively, the body and contracted end of a cartridge shell. A circular hinge sleeve 16 on each link extends in the opposite direction to the loops 14 and 15 and in alignment with the space between the loops, so that the hinge sleeve of one link may engage between the loops of the next link to receive the body of the cartridge shell, the cartridges thus forming the hinge pins for the belt built up by an assembly of links and cartridges. The passageway 12 is of rectangular cross section, with dimensions so that the links may be fed therethrough and guided by the passagewalls and the cover 13, as shown on Figs. 1, 4 and 5. When the links have been properly tempered they should be of the proper shape and dimension, and to insure that only correctly shaped links may enter the passageway 12 of the machine a gauge device G, Figures 1 and 7, is provided at the entrance of the passageway 12, through which the links must readily pass before entering the passageway. The gauge G is so designed that correct links will readily pass therethrough. The link loops 14 and 15 pass through a gauge plate 18, and a recess 19 opposite the tongue 18 receives the hinge sleeve 16, so that if the link has been unduly distorted it will not pass through the gauge, and can then be thrown aside. The links are passed down a feed chute 20 in advance of the gauge, as clearly shown on Figure 1. If a link fails to pass readily through the gauge the operator will throw it aside.

Figure 4:
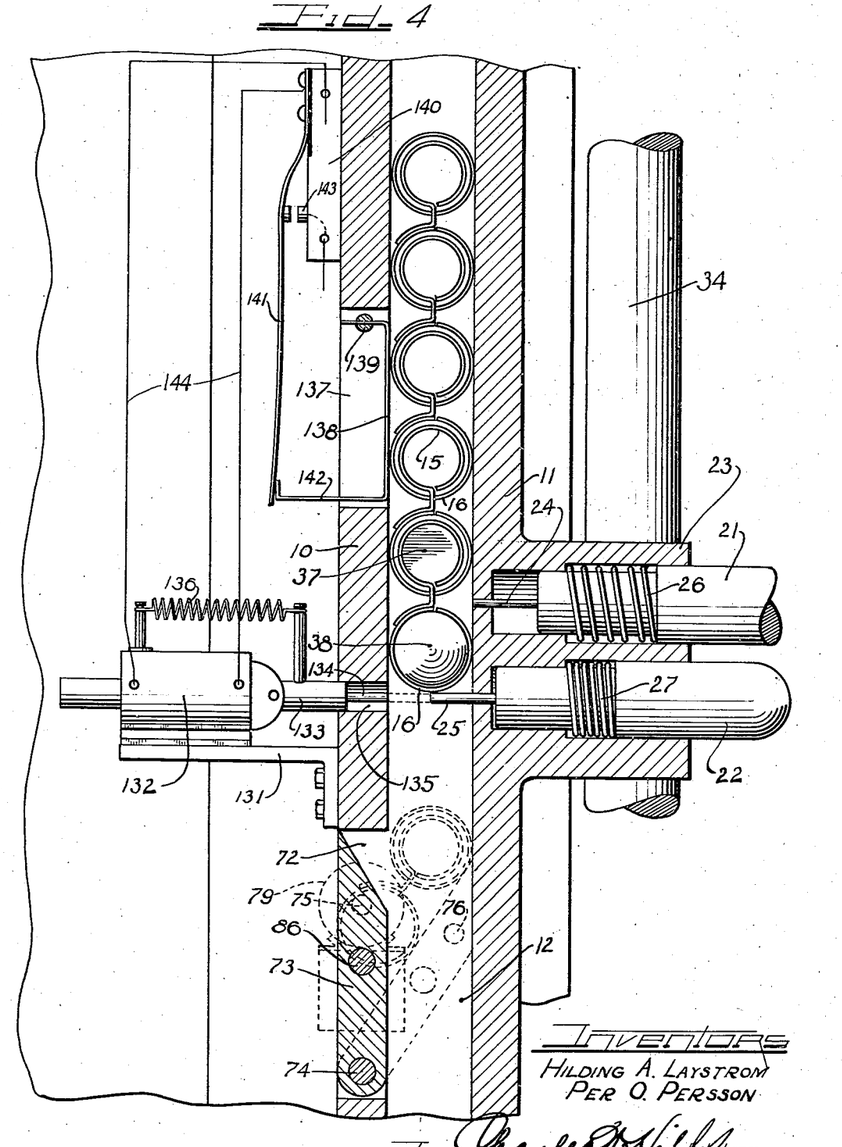
Figure 4 is an enlarged section on plane IV—IV of Figure 2.

The links enter the test passageway 12 with hinge sleeves in advance, for passage of the links through the various testing fields of the machine. Suitable escapement mechanism controls the progress of the links into the testing fields. Referring to Figures 1 and 4, the escapement mechanism comprises upper and lower rods 21 and 22 reciprocable horizontally in a boss 23 formed on the wall 11. The upper rod has the escapement pin 24 extending axially from its inner end and the lower rod 22 has the escapement pin 25 extending from its inner end, the pins projecting into the passageway 12 for engagement with the hinge sleeves 16 of the links. A spring 26 tends to hold the rod 21 in its outer or released position and a similar spring 27 tends to hold the rod 22 in its outer or released position.

Figure 3:
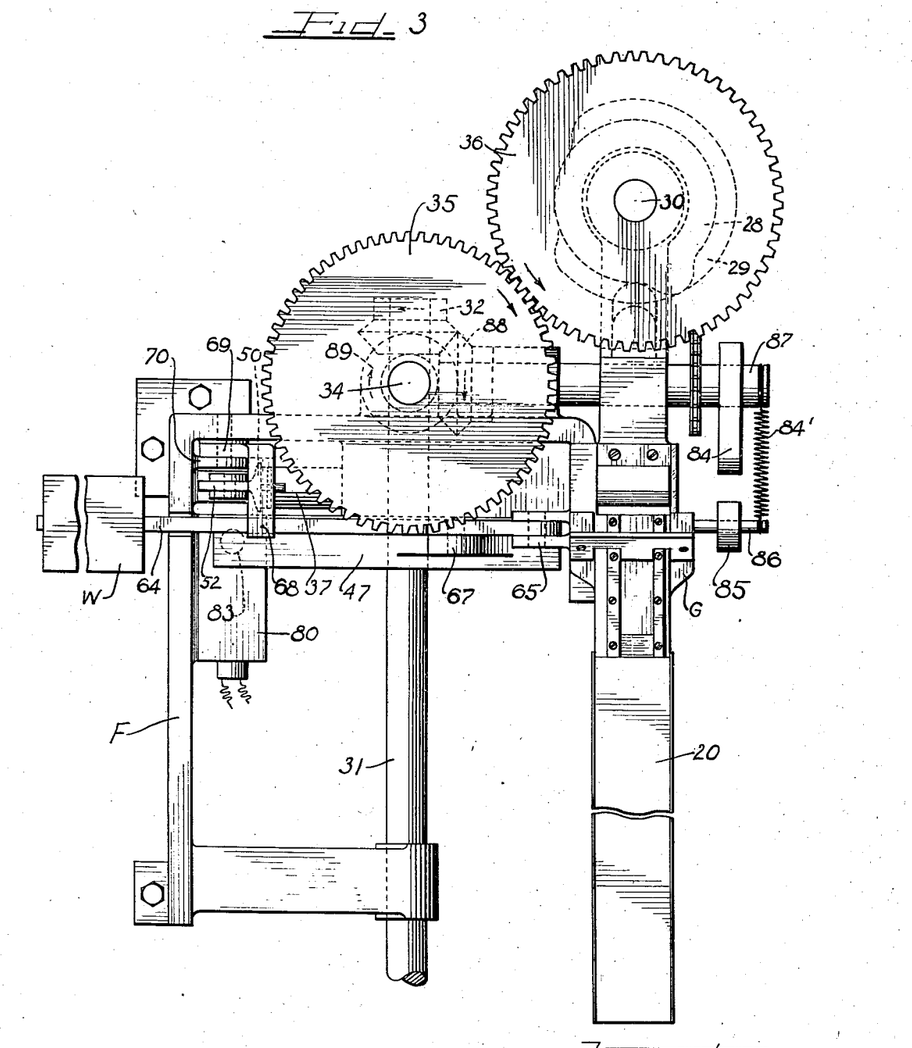
Figure 3 is a plan view.

The rods 21, 22 are engageable at their outer ends by cams 28 and 29 mounted on a vertical shaft 30. As shown on Figures 1 and 3, the contour of the cams is such that the rods 21 and 22 will be alternately shifted to carry their pins 24 and 25 into the passageway 12. The pin 25 holds the lowermost link in position for cooperation therewith of the stretch testing mechanism, which will be fully described hereinafter. As will be described more in detail later, when the link has received the stretch testing mechanism, the lower rod 22 will have been withdrawn to remove the pin 25 from below the lower link and the upper rod 21 will have been shifted by its cam to carry its pin 24 below the hinge sleeve of the next link so as to support the row of links in the passageway 12 above the lower link while this lower link is being given a stretch test. This position of the pin 24 is maintained by its cam until the stretch test mechanism has been withdrawn from the lower link and this link has dropped down in the passageway 12, and then the pin 24 will be withdrawn while the pin 25 is reprojected into the passageway 12 to receive the hinge sleeve of the next link and hold it in position for a stretch test.

A drive shaft 31 is driven from a suitable source (not shown) and extends horizontally into the machine. A bevel gear 32 on the inner end of the shaft meshes a bevel gear 33 on the vertical shaft 34 which, at its upper end, carries a gear 35 meshing with the gear 36 on the shaft 30 on which the cams 28, 29 for the escapement mechanism are mounted. The direction of rotation of the gears and shafts is indicated by arrows.

The strength or stretch testing mechanism is best shown on Figures 2, 3, 5 and 6. This mechanism comprises upper and lower arbors 37 and 38. The upper arbor 37 is axially movable in the bore 39 in the extension 40 on the rear wall 41 of the passageway 12, this wall having the passageway 42 in alignment with the bore 39 and the loops 14 and 15 of the lowermost link in the test passageway, the end 37' of the arbor 37 being of reduced diameter to fit into the loop 15, while the arbor body is of a diameter to fit the loop 14 of the link. A spring 43 within the bore 39 tends to shift the arbor 37 outwardly.

Figure 2:
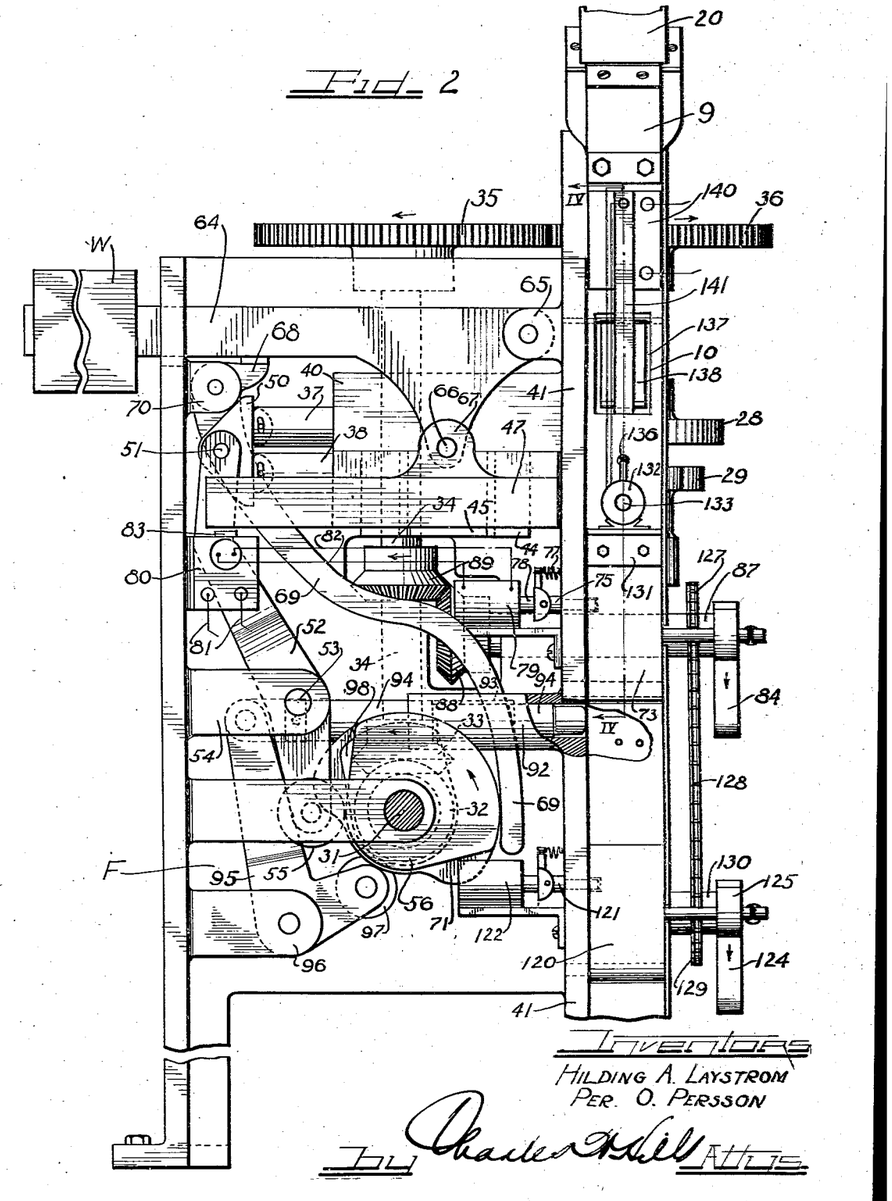
Figure 2 is a left side elevation of the machine.
Figure 5:
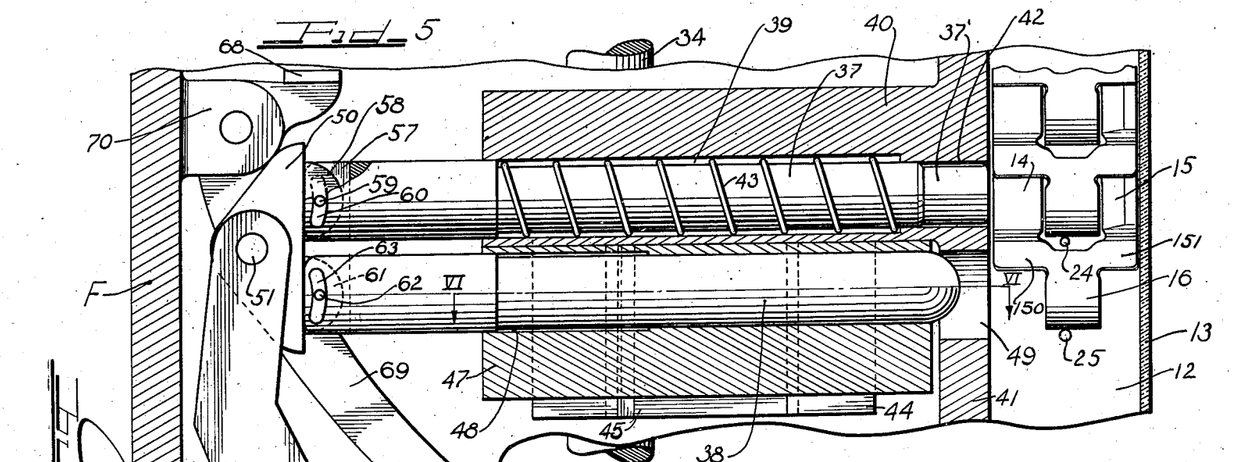
Figure 5 is an enlarged section on line V—V of Fig. 1.
Figure 6:
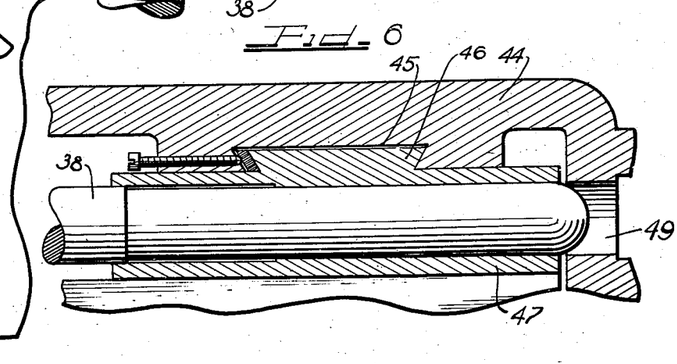
Figure 6 is a section on plane VI—VI of Figure 5.
Figures 9, 11:
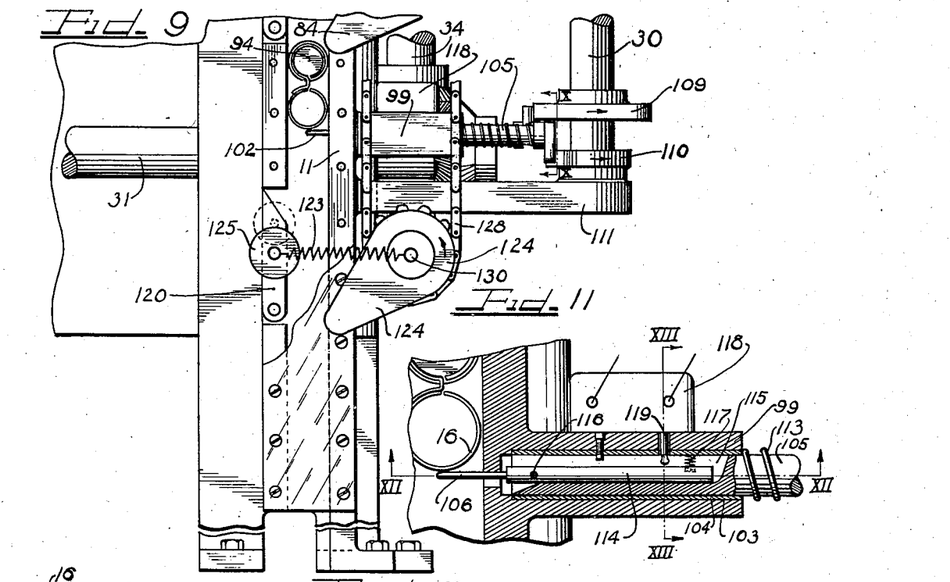
Figure 9 is a front elevation of the lower part of the machine, showing more particularly the operation of the ejection means after the elastic recovery test of a link.
Figure 11 is a section on plane XI—XI of Figure 10.
Figures 10, 12, 13:
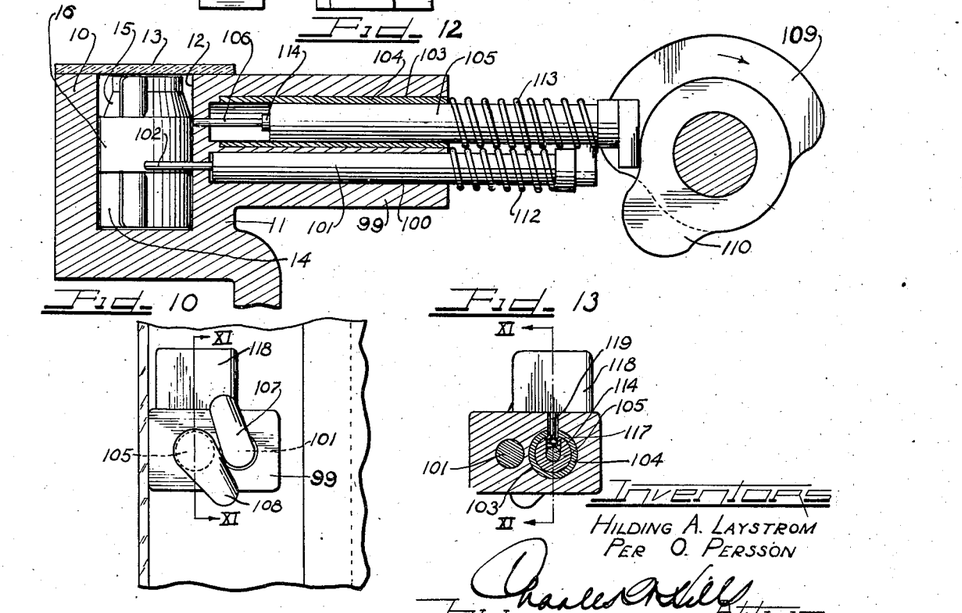
Figure 10 is an enlarged section on plane X—X of Figure 9.
Figure 12 is a section on plane XII—XII of Figure 11.
Figure 13 is a section on plane XIII—XIII of Figure 11.
Figure 14:
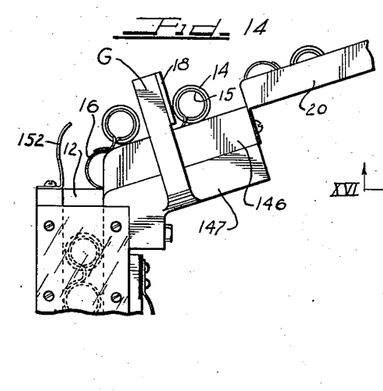
Figure 14 is a front elevation of the upper end of the machine showing a modified feeding arrangement.
Figure 15:
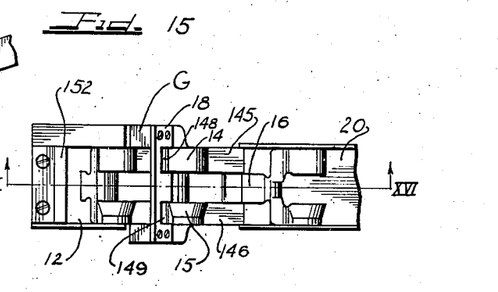
Figure 15 is a plan view of the parts shown in Figure 14.
Figures 16, 17:
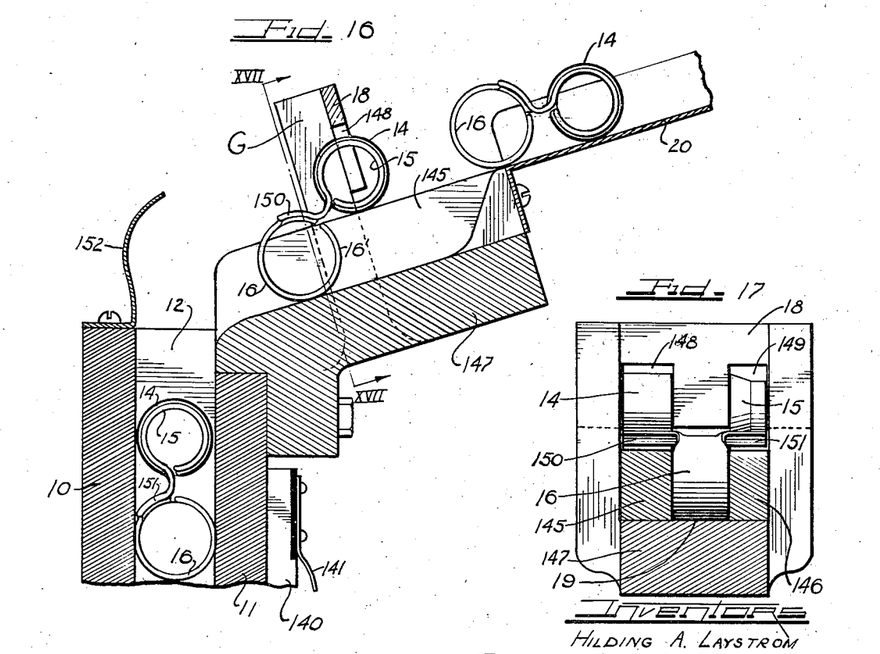

Referring to Figures 2, 5 and 6, the frame extension 40 has a depending wall 44 in which is a vertically extending dovetail guide channel 45 receiving the dovetail guide wing 46 on the frame 47, so that the frame 47 may shift vertically relative to the frame part 40 which supports the arbor 37. The frame 47 has the bore 48 for the arbor 38 and in the wall 41 of the test channel 12 is the passageway 49 through which the end of the arbor 38 may pass for projection through the hinge sleeve 16 of the link to be tested, the passageway 49 being elongated downwardly to permit downward vertical shift of the frame 47.

At their outer ends the arbors 37 and 38 are connected to a head 50 secured by a pin 51 to the upper end of a lever 52 which is fulcrummed by a pin 53 on a bracket 54 extending from the frame F, the lever at its lower end journaling a cam roller 55 engaged by the cam 56 mounted on the drive shaft 31. When this cam rotates from its normal position shown on Figure 2, the lever 52 will be swung to move its head 50 for shifting of the arbors 37 and 38 into the test passageway 12 for reception of the link to be tested. As best shown on Figure 5, the arbor 37 has the slot 57 receiving a wing 58 on the head 50, a pin 59 secured to the wing extending through the arcuate slot 60 in the arbor. The lower arbor 38 is slotted to receive the wing 61 on the head 50, the pin 62 on the wing extending through the arcuate slot 63 in the arbor. With this connecting means, the arbors will be shifted easily into engagement with the link to be tested, without subjecting the arbors to any lateral strain. As the cam 56 recedes, the spring 43 will serve to shift the arbors back to their normal position, with their ends out of the passageway 12.

After the test arbors 37 and 38 have been shifted into engagement with the link to be tested, pressure means are applied to the frame 47, tending to shift the frame downwardly away from the rigid frame part 40, such movement of the frame 47 being resisted by the link engaged by the arbors. Any suitable pressure producing means may be employed. As shown, the pressure is exerted by a weight W, adjustable on the outer end of a lever 64 fulcrummed at its inner end in a bracket 65 extending from the frame wall 41 above the frame extension 40. The lever 64, near its fulcrum point, is connected by a pin 66 with the bracket extending upwardly from the frame 47. The weight lever is normally held in its upper position for engagement of the frame 47 against the rigid frame part 40, in which position the arbors 37 and 38 are in proper relative position for entrance of their ends into the link to be tested. The weight lever is normally held in its upper position by the foot end 68 of a lever 69 fulcrummed in a bracket 70 on the frame F, the lever at its lower end engaging a cam 71 mounted on the drive shaft 31 adjacent to the cam 56. As shown on Figure 2, the contours of these two cams are such that the lever 69 will be held in its normal position until the cam 56 has swung the lever 52 for shift of the test arbors into engagement with the link to be tested. Then the cam 71 will function to release the lever 69 to withdraw its foot 68 from below the weight lever 64 so that the lever 64 may be swung down by its weight to apply downward pressure against the frame 47 in which the arbor 38 is carried. This pressure on the arbor 38 is communicated to the link and the link is therefore subjected to pressure tending to stretch it longitudinally. The weight W is adjusted so that, if the link being tested is of proper strength, it will resist stretching thereof beyond a predetermined tolerance, and the link will be acceptable. After the test, the weight pressure is removed from the frame 47 and the test arbors are withdrawn and the escapement mechanism is operated to withdraw the holding pin 25 from below the tested link, which link may then continue its travel through the test passageway 12 for further testing.

If the link does not satisfy the stretch test, provision is made for discharging the link from the test passageway. Such discharge controlling mechanism is best shown in Figures 1, 2 and 4. Below the path of the escapement pin 25, the wall 10 of the testing channel 12 has the ejection opening 72 normally closed by a gate 73 hinged at its lower end on the pin 74. The gate is normally held closed by a latch pin 75 extending through the back wall 41 of the test passageway for engagement in a keeper recess 76 in the adjacent edge of the gate (Figure 8). A spring 77 tends to hold the latch pin in its latching position, as shown best on Figure 2. The latch pin is secured to the end of the core 78 of a solenoid 79 which, when energized, will draw the pin out of its latching position to permit opening of the gate. A suitable quick-acting switch 80 receives current supply from a supply line 81 and controls the solenoid circuit 82. The actuating element for the switch comprises a button 83 and is located a predetermined distance below the movable arbor frame 47. If a link, while being tested under the force of the weight W, does not stretch beyond a predetermined tolerance, then the frame 47 will not be shifted downwardly far enough to engage the switch button 83. However, if the link is faulty in strength and gives way to the weight pressure, and the frame 47 moves downwardly sufficiently to press the switch button 83, then the solenoid circuit will be closed and the latch pin will be withdrawn from the ejector gate 73. A spring 84' tends at all times to swing the ejector gate open, and when the gate is unlatched by operation of the solenoid this spring will swing the gate inwardly into an inclined position against the wall 11 of the test passageway 12, the end of the gate being beveled so as to intimately engage the wall, and the defective link, after release from the escapement pin 25, will fall down against the inclined gate and will be ejected from the test passageway, as indicated by dotted lines on Figure 4. Means are provided for reclosing the gate after ejection of a defective link. A cam 84 is provided for this purpose, this cam being cooperable with a cam roller 85 on a stud 86 extending from the gate. The cam is secured on a cross shaft 87 having at its inner end a bevel gear 88 meshing with a bevel gear 89 on the shaft 34 which is driven by the drive shaft 31. As best shown on Figure 1, this shaft 34 is journaled in arms 90 and 91 which also serve, at their outer ends, to journal the shaft 30 which operates the escapement cams 28 and 29. As shown on Figure 3, the spring 84' may be connected between the outer end of the shaft 87 and the outer end of the stud 86. The cam 84 rotates in the direction indicated by the arrow on Figure 1 and at the proper time engages with and travels past the cam roller 85 to swing the gate to its closed position, the end of the latch pin 75 being beveled and the edge of the gate being also beveled so that the latch pin will be shifted out by the closing gate and will then be reset into the recess 76 by the spring 77.

The elasticity characteristic of the metal of the links, after tempering thereof, should be such that after a stretch test of a link by the arbors 37 and 38, the link, on release from the arbors, should return to its true form within allowed tolerances. A link when subjected to the stretch test may possess sufficient molecular strength to prevent a stretch which would cause it to be ejected by the machine and yet its elastic recovery would not be sufficient to return it to its proper length within the prescribed tolerances. Each link, therefore, after passing the stretch test, is subjected to an elastic recovery test. Such test is accomplished by the mechanism best shown on Figures 1 and 2 and 9 to 13. Just below the ejector gate 73, the back wall 41 for the test passageway 12 has the extension 92 which has the bore 93 for an arbor 94, the arbor being projectible into the test passageway through the loops 14 and 15 of a link to be tested. At its outer end the arbor 94 is connected to a bell crank lever 95 fulcrummed on the bracket 96 with its lower arm carrying a cam roller 97 engaged by the cam 98, this cam being mounted on the drive shaft 31 adjacent to the cam 56 which controls the reciprocation of the stretch testing arbors 37 and 38. The timing of these two cams is such that the arbors 37 and 38 and the arbor 94 will be shifted substantially simultaneously into the test passageway.

Below the path of the arbor 94, holding and measuring means are provided for the link to be tested for elastic comeback. The wall 11 of the test passageway 12 has the lateral extension 99 having the bore 100 for a rod 101 which carries at its inner end a pin 102 projectible into the test passageway below a link to hold the link in position ready for its elastic come-back test. Adjacent to the bore 100, the extension 99 has the bore 103 within which is a bushing 104 for a rod 105 which, at its inner end, carries a pin 106 for projecting into the testing passageway below the link to be tested. At their outer ends the rods 101 and 105 terminate respectively in abutment feet 107 and 108 for engagement by cams 109 and 110, respectively. These cams are mounted on the lower end of the shaft 30, the shaft at its lower end being journaled in the supporting arm 111. Springs 112 and 113 keep the abutment feet in engagement with their respective cams, and the contours of the cams are such that the rods will be alternately shifted to project their pins into the test passageway.

The pin 106 extends from the end of a lever 114 located within the channel 115 extending longitudinally in the rod 105, the lever adjacent its outer end being fulcrumed on a pin 116 for vertical swing, a spring 117 tending to hold the lever in horizontal position. On the extension 99 is mounted a switch 118 having an actuating pin 119 opposite the inner end of the lever 114, so that if this lever is rocked sufficiently on its pivot its inner end will engage with and shift the pin 119 for closure of the switch. As will be described more in detail later, this switch controls the circuit for a solenoid which in turn controls an ejector gate for links which do not pass the elastic come-back test.

When a link has passed the stretch test it will continue down the test passageway to be received and held by the pin 102 on the rod 101, the rod 105 being at that time in its outer position with its pin 106 withdrawn from the test passageway. The link being held by the pin 102 is in position to receive in its loops 14 and 15 the end of the arbor 94, which is projected as soon as the link has reached the holding pin 102. The timing of the arbor cam 96 and of the cam 109 for the rod 101 is such that as the arbor enters the link loops the rod 101 will be withdrawn from below the link, so that the link will then be suspended within the test passageway by the arbor. As the rod 101 is being withdrawn, the rod 105 is shifted inwardly by its cam 110 to project the pin 106 below the link, as shown on Figure 11. If, after the stretch test on the link, the link has been returned to its acceptable form by its elastic characteristics, then, when the pin 106 engages the lower end of the link while the link is suspended from the arbor 94, the pin supporting lever 114 will not be rocked on its fulcrum, or will not be rocked a sufficient distance for engagement with the switch button 119 for closure of the switch 118. Then, as the arbor is withdrawn from the link, the link will continue down through the test passageway. However, if the link has not recovered sufficiently from its stretch test to be acceptable, the lever 114 will be rocked sufficiently to effect closure of the switch 118, and then an ejector gate 120 is interposed in the path of the link for ejection therefrom from the test passageway. The ejector gate 120 is of substantially the same construction as the ejector gate 73, and is normally held closed by a latch pin 121 controlled by a solenoid 122 whose circuit is controlled by the switch 118, so that when the switch is closed the solenoid will be energized to withdraw the latch pin for opening of the gate 120. The spring 123 tends to swing the gate 120 open for ejection of a rejected link, and a cam 124 is engageable with a roller 125 on the gate to return the gate to its closed position after an ejection operation. The cam is operable in synchronism with the cam 84 which controls the closure of the gate 73, a sprocket wheel 127 on the shaft 87 for the cam 84 being connected by a chain belt 128 with a sprocket wheel 129 on the shaft 130 for the cam 124.

It may happen that, while the machine is in operation, the feeding of links into the test passageway may be interrupted for some reason. When this occurs it is very important that, when feeding is again continued, the first link should be in proper test position for the stretch test arbors, as otherwise the link may be crushed and cause breakage of machine parts. To take care of this situation we have devised holding means which, in case of stoppage of feed to the test passageway, will hold in testing position the last link tested by the stretch test arbors. This stop mechanism and its control is best shown on Figures 1, 2 and 4. Mounted on a bracket 131 extending from the side wall 10 of the test passageway, is a solenoid 132 whose core 133 carries a stop pin 134 projectible through the passageway 135 into the test passageway 12 below the link in the stretch test field. A spring 136 tends to hold the core and pin in outer position.

Above the pin passageway 135 the wall 10 has the opening 137 therein, in which a control plate 138 hangs from a pivot pin 139. Above the opening 137 a switch 140 is secured, this switch having a blade 141 extending downwardly therefrom into engagement with the laterally extending arm 142 on the plate 138. This switch blade exerts spring pressure tending to swing the plate inwardly, and during the normal feed flow of links through the test passageway the plate will be held with its inner surface against the passing links so as to steady the links and assist in aligning them for accurate downward flow into the stretch testing field. When the link feed into the top of the test passage is interrupted for any reason and there is no link in the path of the plate 138, the switch blade will be free to swing the plate inwardly into the test passageway and engage with the switch contact 143. The electrical circuit 144 for the solenoid 132 will then be closed and the solenoid energized to shift its core for projection of the stop pin 134 below the last link to pass the plate 138. This link will be held in proper position for engagement by the stretch test arbors 37 and 38 and the pin 134 will not interfere with the operation of the escapement pins 24 and 25, and so long as the supply feed to the test channel remains interrupted, the link stopped by the pin 134 will remain in position to repeatedly receive the arbors. However, as soon as the supply feed is continued, the links entering the test passageway will travel past and swing the plate 138 back to its normal position for removal of the switch blade 141 from the switch contact 143, and opening of the solenoid circuit so that the spring 136 may effect withdrawal of the stop pin 134, the control of the links being then reassumed by the escapement pins 24 and 25.

Referring again to the gauging means G, if a link is of true and proper shape, its hinge sleeve 16 will pass readily between the rails 145 and 146 extending upwardly from the base 147 of the gauge to define the test channel 19, and the loops 14 and 15 of the links should pass readily through the test slots 148 and 149 in the gauge plate 18. If the free ends of the sleeve and loops are axially displaced and the side edges of the sleeve and loops are not in parallel planes at right angles with the axes of the sleeve and loops the link will not pass readily through the gauge and must be rejected. It is therefore important that as much as possible of the hinge sleeve be received in the test channel 19 and as much as possible of the loops be received in the test slots 148 and 149 for accurate testing of the link. The links are fed down the inclined chute 20 and in order that the links may be properly gauged, they should be in the proper inclination for passage through the gauge G to bring the sleeve and loops of a link into proper testing position in the channel 19 and the gauge plate slots. In the arrangement shown on Figure 1, where the feed chute 20 extends from the left to the testing passageway 12, the engagement of the ends of the wing or lip portions 150 and 151 of the link with the tops of the rails 145 and 146 is depended upon to give the link the proper inclination before travel through the gauge. After passage of the links through the gauge the gauge rails will facilitate the entry of the links into the top of the testing passageway with the hinge sleeves foremost.

In the arrangement shown on Figures 14 to 17, the feed of the links to the test passageway is from the right. As a link traveling down the inclined supply chute 20 reaches the gauge structure, the hinge sleeve 16 of the link will swing down into the testing channel 19 between the rails 145 and 146 while the loop 14 of the link will engage with the top of the rail 145, as best shown on Figure 16. As the link continues along the gauge, the loops 14 and 15 will pass through the test slots 148 and 149 respectively and the hinge sleeve 16 will continue between the test rails 145 and 146. These test rails are of a height to extend along the opposite edges of the link hinge sleeve 16 for accurate gauging of the sleeve for any twist or axial displacement of the free end 16' of the sleeve relative to the diametrically opposite portion of the sleeve, and the height of the rails will also hold the loops 14 and 15 well within the testing slots 148 and 149 for engagement of the test plate 18 with the opposite edge of the loops for accurate gauging thereof for twist or other lateral displacement. If the sleeve and loops of a link have been distorted, the link will not travel freely through the gauge but will be stopped thereby and will then be ejected by the operator. Those links which pass the gauge test will continue and fall into the vertical testing passageway 12, a guide 152 assisting in guiding the links properly into the passageway.

Briefly reviewing the operation, the links propelled by gravity down the chute 20 are fed in a continuous line through the test passageway 12 after having passed the test by the gauge G. The escapement pins 24 and 25 will control the regular advance of the links, first into the stretch testing field for engagement by the arbors 37 and 38. If the link passes this stretch test it continues down the passageway, but any link failing to pass this test is ejected by the gate 73. The links then enter the elastic come-back testing field, under control of the stop pin 102 and the test pin 106, and the links which pass this test will continue in the test passageway for delivery therefrom. Any link which fails to pass the elastic come-back test will effect closure of the switch 118 and operation of the ejector gate 120 for ejection of the rejected link. Upon interruption of the feed supply to the test passageway, the plate 138 will function and the solenoid 132 will be operated for projection of the pin 134 to hold the last link in the stretch testing field until the supply feed has been continued and the plate 138 returned to its normal position.

We have shown a practical and efficient embodiment of our invention but we do not desire to be limited to the exact construction and arrangement or operation shown and described, as changes and modifications may be made without departing from the scope of the invention.

We claim as our invention:

1. A machine for testing metallic cartridge belt links each having at one end axially aligned cartridge receiving loops and at the other end a hinge sleeve, comprising means defining a test passageway, means controlling the progressive movement of a line of links through said passageway, a pair of arbors projectible into said passageway for engagement of one arbor in the loops of a link and engagement of the other arbor in the hinge sleeve of said link, means for effecting separation under predetermined force of said arbors whereby to subject the link thereon to a stretch test, and ejector mechanism effective upon a predetermined separation movement of said arbors for ejecting the link from said passageway after withdrawal of said arbors from the link.

2. A machine for testing metallic cartridge belt links each of which have at one end axially aligned but spaced apart cartridge receiving loops and at the other end a hinge sleeve, comprising means defining a test passageway, control means for controlling the progressive movement of a line of links through said passageway, a pair of parallel test arbors, means for shifting said arbors into said passageway for engagement thereof with successive links and with one of said arbors extending through the loops of a link and the other arbor extending through the hinge sleeve of the link, means for effecting transverse separation of said arbors under a predetermined force whereby a link carried by the arbors is subjected to a stretching test, said passageway having an ejector outlet in one of its side walls, and means effective upon stretch of a link by said arbors beyond a predetermined distance under said force for diverting the link through said ejector opening after release of the link from said arbors.

3. A machine for testing metallic cartridge belt links each of which have at one end axially aligned but spaced apart cartridge receiving loops and at the other end a hinge sleeve, comprising means defining a test passageway, control means for controlling the progressive movement of a line of links through said passageway, a pair of parallel test arbors, means for shifting said arbors into said passageway for engagement thereof with successive links and with one of said arbors extending through the loops of a link and the other arbor extending through the hinge sleeve of the link, means for effecting transverse separation of said arbors under a predetermined force whereby a link carried by the arbors is subjected to a stretching test, said passageway having an ejector outlet in one of its side walls, a closure for said ejector opening, means normally locking said closure to close said opening, unlocking means rendered effective upon abnormal stretch of a link by said arbors under said predetermined force for unlocking said closure, and means for moving the unlocked closure into said test passageway for intercepting the link after release thereof from said arbors and diverting it through said ejector opening to the exterior of said test passageway.

4. A testing machine for the purpose described, comprising means defining a testing passageway, means controlling the progression of a link through said passageway, a pair of supporting members movable into said passageway for engagement in the respective ends of the link, means for effecting separation of said supporting members by a predetermined force whereby to subject the supported link to a tension tending to elongate the link, a holding member movable into said passageway to engage in the trailing end of the link after release of the link from said pair of supporting members, gauging means engageable with the other end of the link on said holding member for gauging the elongation of the link by said pair of supporting members, ejector means for said passageway, and means controlled by said gauge means for operating said ejector means to eject the link from said test passageway if said link has been unduly elongated.

5. A testing machine for the purpose described, comprising means defining a testing passageway, means for controlling the progress of a link to be tested through said passageway, means for receiving the link within said passageway and subjecting it to a longitudinal tension under a force calculated to permit the link after such tension strain to be returned to its normal length, means movable into said passageway for receiving the link at one end after its tension test, measuring means movable into said passageway for engagement with the other end of the link for determining the degree of elongation of said link under said tension, ejector means for said passageway, operating means for said ejecting means, and means controlled by said measuring means for effecting operation of said operating means for operation of said ejecting means to eject the link from said passageway if said link has been lengthened beyond allowable tolerance by said tension means.

6. A machine for testing metallic cartridge belt links of the class described comprising means defining a test passageway, means for feeding links into said passageway, means controlling the progression of the links through said passageway, testing means projectible into said passageway for successively receiving and subjecting the links to a strength and distortion test, and means effective upon interruption of said feeding means for holding in said passageway the last fed-in link until feeding of links is again resumed.

7. A machine for testing metallic cartridge belt links of the type described, comprising means defining a test passageway for the links, means for subjecting each link in said passageway to longitudinal tension under a predetermined force calculated to be less than that which would stretch the link beyond the predetermined tolerance, means for ejecting from the passageway the links which have stretched beyond such tolerance, means for then testing for elastic comeback the links which have passed the tension test, and means for ejecting from the passageway those links which fail to pass the elastic test.

8. A machine for testing metallic cartridge belt links of the class described, comprising means defining a test passageway, means for feeding links into said passageway, means controlling the progression of the links through said passageway, testing means projectible into said passageway for successively receiving and subjecting the links to a strength and distortion test, and means effective upon interruption of said feeding means for stopping further progress through said passageway of any links therein when the feeding means is interrupted.

9. A machine for testing metallic cartridge belt links of the class described, comprising means defining a test passageway, means for feeding links into said passageway, means controlling the progression of the links through said passageway, testing means projectible into said passageway for successively receiving and subjecting the links to a strength and distortion test, and stop means automatically controlled upon interruption of said feeding means to be projected into said passageway below the link being tested to prevent further progress of said link through said passageway.

10. A machine for testing metallic cartridge belt links of the class described, comprising means defining a test passageway, means for feeding links into said passageway, means controlling the progression of the links through said passageway, testing means projectible into said passageway for successively receiving and subjecting the links to a strength and distortion test, stop means automatically controlled upon interruption of said feeding means to be projected into said passageway below the link being tested to prevent further progress of said link through said passageway, and means for automatically causing withdrawal of said stop means when said feed means resumes feeding of links into said passageway.

HILDING A. LAYSTROM.
PER O. PERSSON.